July 10, 1923.
H. S. LARSEN
POTATO PLANTING MACHINE
Filed June 5, 1922
1,461,396
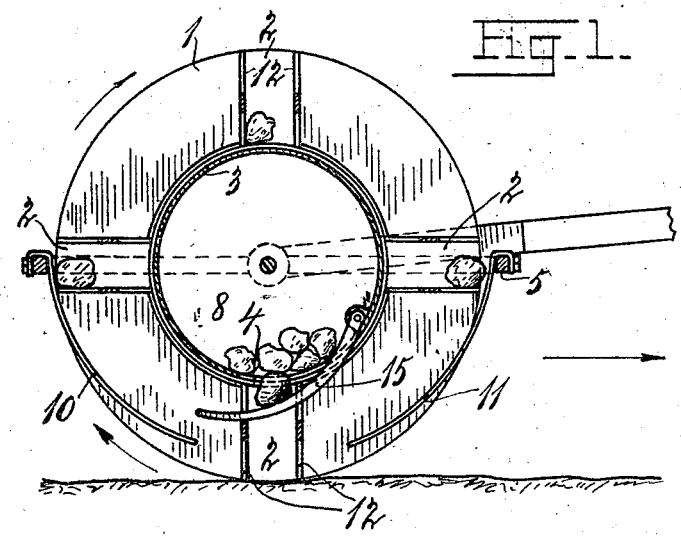
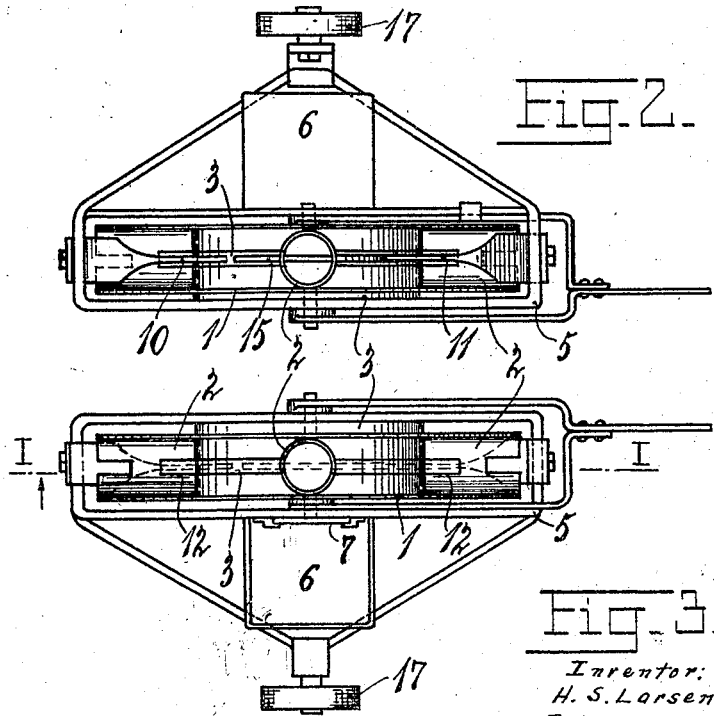
Inventor:
H. S. Larsen
By
Langner, Parry, Card + Langner
Attys.

Patented July 10, 1923.

1,461,396

UNITED STATES PATENT OFFICE.

HAAKON SIGVART LARSEN, OF CHRISTIANIA, NORWAY.

POTATO-PLANTING MACHINE.

Application filed June 5, 1922. Serial No. 566,044.

*To all whom it may concern:*

Be it known that I, HAAKON SIGVART LARSEN, a subject of the King of Norway, residing at Christiania, Norway, have invented certain new and useful Improvements in Potato-Planting Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The present invention relates to the kind of potato planting machines, which is provided with a rotating wheel for distributing the potatoes in combination with a receptacle located near the hub of the wheel and supplied with potatoes from the outside.

The present invention consists in providing the said wheel with radial or substantially radial tubes or channels, the inner ends of which in a certain position communicate with an outlet opening from the said receptacle so as to receive a potato from the latter. Further there is provided a stationary arm 15 fastened to said receptacle and fitting into slots in each radial tube, when the latter passes the outlet opening from the receptacle, so as to let only one potato at a time from the receptacle into the radial channel, as it passes the outlet opening from the receptacle.

On the drawing:

Fig. 1 is a sectional side view of an embodiment of the invention. Fig. 2 is a bottom view and

Fig. 3 is a plan.

The wheel 1 is preferably provided with four radially arranged tubes or channels 2, which are open outwards at the periphery of the wheel, but are closed at the inner end by means of a drum 3 on the potato receptacle, which extends into an annular compartment at the center of the wheel in such a manner that the inner ends of said tubes or channels are situated at a small distance from the outside of said drum. The latter is provided at its lowest part with an opening 4 for the potatoes, which are fed into the room 8 within said drum 3 through an adjustable door 7 from a receptacle fastened to the frame 5 in such a manner that the potatoes go one by one into the tubes or channels at their lower position. The potato, which has fallen down into a tube will be carried along in the direction of the arrow and rests under about half of the rotation of the wheel upon the upper side of the drum 3, and when the said tube has reached its lowest position vertically under the axis of the wheel, the potato falls out from the tube and down the furrow, and in order to prevent the potato from falling out of the tube before arriving at the lower position, ribs 10 and 11 are arranged on the frame, situated at the periphery of the wheel, and the lower part of said ribs may be reduced and bent inwards to cooperate with apertures in the side walls of the tubes in order to assure the delivery of the potatoes and to clean the tube of grass and mud. To regulate the delivery of potatoes from the compartment 8, a fixed lever 15 is arranged, which at the lowermost position of the tubes engages apertures in the upper part of the walls of the tubes in such a manner that the lever serves as a bottom in the tubes so that only one potato at a time can be admitted. This potato will then be carried along at the revolution of the wheel and delivered at its lower position, where the potato falls down into the furrow.

In order to balance the machine it is provided with a sidewheel 17, rolling on the ground.

The dimensions of the wheel are so chosen that the distance between the tubes corresponds with the required distance between the potatoes in the furrow. The wheel, which may preferably be used in cooperation with a plough, may be made of two parallel plates between which the tubes or channels are arranged.

Claims:

1. In a potato planting machine a rotating wheel, a stationary cylindrical receptacle for potatoes mounted co-axially within the said wheel, radial potato feeding channels in the said wheel, an outlet opening for potatoes in the bottom of the receptacle, said radial channels registering successively with said outlet opening during the rotation of the wheel, so as to receive potatoes from the receptacle.

2. In a potato planting machine a rotating wheel, a stationary cylindrical receptacle for potatoes mounted co-axially within the said wheel, radial potato feeding channels in the said wheel, an outlet opening for potatoes near the bottom of the receptacle, said radial channels registering successively with said outlet opening during the rotation of the wheel, so as to receive potatoes from the receptacle, and an arm or guide mounted below the outlet opening from the receptacle at such a distance as to allow only one potato at a time to be let out through the outlet opening and into each planting channel.

3. In a potato planting machine a rotating wheel, a stationary cylindrical receptacle for potatoes mounted co-axially within the said wheel, radial potato feeding channels in the said wheel, an outlet opening for potatoes near the bottom of the receptacle, said radial channels registering successively with said outlet opening during the rotation of the wheel, so as to receive potatoes from the receptacle, an arm or guide mounted below the outlet opening from the receptacle at such a distance as to allow only one potato at a time to be let out through the outlet opening and into each planting channel and stationary curved plates covering the lower half of the circumference of the planting wheel except at the lowest point of the same so as to prevent the potatoes from being let out of the channels at incorrect points.

In testimony that I claim the foregoing as my invention, I have signed my name in presence of two subscribing witnesses.

HAAKON SIGVART LARSEN.

Witnesses:
MAGNUS BUGGE,
EDWARD JOHNSON.